(No Model.)
F. C. AVERY.
MEANS FOR CONNECTING BICYCLE CRANKS AND SPROCKET WHEELS WITH SHAFTS.
No. 595,515. Patented Dec. 14, 1897.
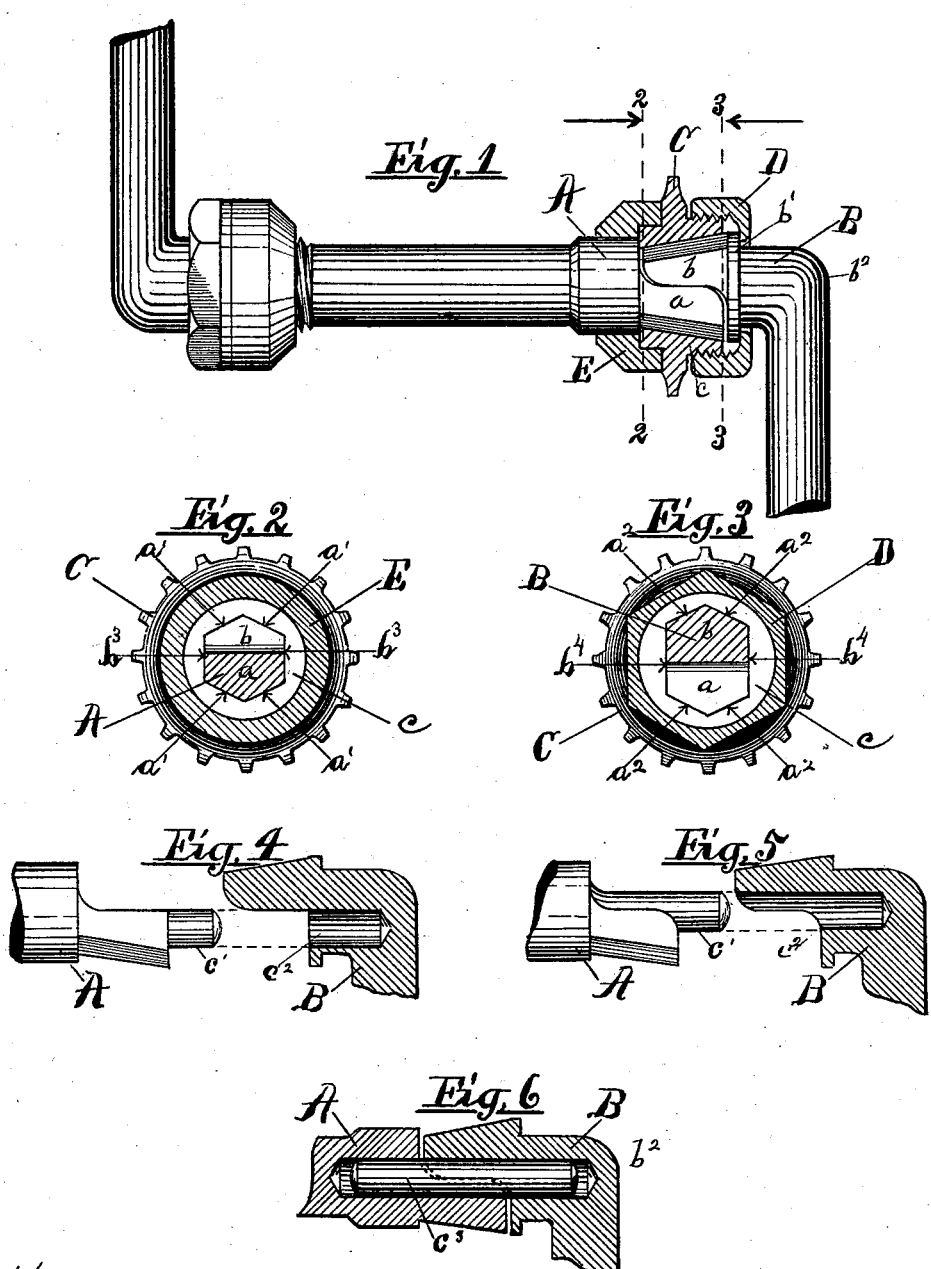
Witnesses,
M. D. Bloudel
Amos W. Hart
Inventor,
F. C. Avery.
By Munn & Co.
Attorneys

UNITED STATES PATENT OFFICE.

FREDERICK C. AVERY, OF TOLEDO, OHIO.

MEANS FOR CONNECTING BICYCLE-CRANKS AND SPROCKET-WHEELS WITH SHAFTS.

SPECIFICATION forming part of Letters Patent No. 595,515, dated December 14, 1897.

Application filed December 15, 1896. Serial No. 615,746. (No model.)

*To all whom it may concern:*

Be it known that I, FREDERICK C. AVERY, of Toledo, in the county of Lucas and State of Ohio, have invented a new and Improved Means for Connecting Bicycle - Cranks and Sprocket-Wheels with Shafts, of which the following is a specification.

One or both of the cranks of a bicycle are ordinarily made detachable from the shaft. It is the object of my invention to so construct a bicycle-crank, sprocket-wheel hub and shaft that they may be firmly and rigidly connected or fastened together and yet adapted to be readily detached when required; and it is a further object to effect this by a simple and cheap construction of parts without increasing their usual size or changing their usual position.

In the accompanying drawings, Figure 1 is a partly-sectional view of a bicycle shaft, bearings, and crank attachments. Figs. 2 and 3 are transverse sections on lines 2 2 and 3 3, respectively, of Fig. 1. Figs. 4, 5, and 6 are sectional views showing modifications hereinafter specifically described.

A indicates the axle of a bicycle driving-wheel, the same having the usual bent crank and adjustable cone at one end and a detachable crank B and sprocket-wheel C at the other end. My invention pertains solely to the construction and means for fastening or locking such crank and sprocket-wheel C together and to the shaft A.

I will first describe the invention as illustrated in Figs. 1, 2, and 3.

E indicates a cone-bearing which may be fast on the shaft A, and is provided with a recess or socket in its outer end. The hub $c$ of the sprocket-wheel C has a tapered polygonal bore and its outer end is screw-threaded exteriorly, as shown in Fig. 1. Its plain inner end fits in the socket of cone E. The shaft A and crank B are provided with tapered polygonal tenon portions $a$ and $b$, which are adapted to lap and fit together and also to fit in the hub $c$ of sprocket-wheel C, while a flanged and interiorly-threaded nut D is adapted to screw on said hub and thus detachably fasten or lock the parts together. Said nut D abuts a circumferential flange $b'$ on the crank and has a central aperture which is made of sufficient diameter to adapt it to pass over the angle $b^2$ of the latter. One longitudinal half of the polygonal shaft-tenon $a$ is cut away and the tenon $b$ of crank B is similarly constructed, the two tenons $a\,b$ being thus adapted to fit together. The said tenons differ, however, in this, that the crank-tenon $b$ is tapered from the flange $b'$ to its free or outer end. The shaft-tenon $a$ is tapered in the opposite direction, or from its free end to the shoulder. Thus the two tenons form together a tapered polygonal part whose smaller end is farthest from the crank B and which is adapted to fit snugly in the hub $c$ of sprocket-wheel. It is hence apparent that by screwing the nut D on said hub $c$, as shown in Fig. 1, the hub will slide on such jointed and tapered part and clamp the tenon members $a\,b$ together with a force corresponding to the degree of traction applied by means of the nut.

It will be observed the free ends of the tenons $a\,b$ abut transverse shoulders of the shaft and crank, respectively, and thus add to the rigidity of the joint.

As shown in Fig. 2, the hub bore or socket is hexagonal, the two sides $b^3$ being parallel and the others $a'$ at an obtuse angle to them and to each other. Moreover, the said sides $a'$ and $b^3$ are nearly or practically of same width. In Fig. 3, on the other hand, the hub bore or socket is not thus symmetrical diametrically, but oblong, since the parallel sides $b^4$ are longer than the angular sides $a^2$. This construction not only provides the taper required for due frictional engagement and clamping action of the sprocket-wheel, but also squarely-abutting surfaces for lateral leverage when the crank is rotated.

In the modifications shown in Figs. 4 and 5 the shaft-tenons are provided with a cylindrical axial extension or pilot pin $c'$ and the crank-tenon with an axial socket $c^2$, adapted to receive the same. It is apparent this construction materially strengthens the joint.

In Fig. 6 both tenons are provided with sockets, and a removable dowel-pin $c^3$ is fitted therein. When it is necessary to remove crank B, the nut D is screwed back against the pedal-arm of the same, and by continuing to rotate it the tapered crank-tenon will be drawn out of the sprocket-hub.

It is manifest that the hub hereinbefore referred to might form part of a bevel-gear or a band-pulley, as well as that of a sprocket-wheel, since no change of construction, function, or result would be necessary or ensue.

It is to be understood I do not restrict myself in all cases to a hexagonal hub-socket, for various other polygonal shapes may obviously be adopted.

What I claim is—

1. The combination of a bicycle shaft and crank having reduced and oppositely-tapered polygonal tenons, a motor-wheel having a bore adapted to fit such tenons when lapped as specified, and a nut for engaging said wheel, and causing it to hold the tenons in unyielding contact, substantially as shown and described.

2. The combination of the bicycle shaft and crank having longitudinally-halved, polygonal tenons which are tapered in opposite directions, so that when lapped they form a tapered part as specified, a sprocket-wheel having a hub which is tapered and polygonal corresponding to such jointed part, and has an exterior screw-thread, and a flanged nut which engages a collar on the crank and has an internal screw-thread for connecting with the aforesaid hub, whereby the latter may be forced on the tapered and lapped members to clamp them rigidly together, as specified.

3. The combination of bicycle shaft and crank tenons which are longitudinally halved and tapered in opposite directions but provided with two parallel straight sides, as specified, a sprocket-wheel hub having a bore which is similarly provided with inclined and parallel sides, and a nut for engaging the wheel-hub and holding it in clamping engagement with the shaft and crank, as shown and described.

4. The combination of the bicycle shaft and crank tenons which are made polygonal and tapered in opposite directions, one of them being provided with an axial extension or pilot-pin and the other with a corresponding axial socket, a sprocket-wheel whose hub fits on the tapered members when lapped, and a nut applied to the crank and hub of said wheel, as and for the purpose specified.

FREDERICK C. AVERY.

Witnesses:
  CHAS. C. DAWSON,
  CATHARINE R. DAWSON.